US012583116B2

(12) United States Patent
Heintzelman et al.

(10) Patent No.: US 12,583,116 B2
(45) Date of Patent: Mar. 24, 2026

(54) SYSTEM AND METHOD FOR LOCATION MONITORING AND EVENT-BASED SENTINEL MANAGEMENT

(71) Applicant: RESIDEO LLC, Golden Valley, MN (US)

(72) Inventors: Christopher Heintzelman, Plymouth, MN (US); Soumitri Kolavennu, Blaine, MN (US); Warren Young, Arden Hills, MN (US); Joseph Bodkin, South Burlington, VT (US); John Cronin, Jericho, VT (US)

(73) Assignee: RESIDEO LLC, Golden Valley, MN (US)

( * ) Notice: Subject to any disclaimer, the term of this patent is extended or adjusted under 35 U.S.C. 154(b) by 0 days.

(21) Appl. No.: 18/646,972

(22) Filed: Apr. 26, 2024

(65) Prior Publication Data

US 2024/0269851 A1 Aug. 15, 2024

Related U.S. Application Data

(63) Continuation of application No. 18/058,108, filed on Nov. 22, 2022, now Pat. No. 11,969,901, which is a
(Continued)

(51) Int. Cl.
*B25J 9/16* (2006.01)
*B25J 9/00* (2006.01)
(Continued)

(52) U.S. Cl.
CPC .......... *B25J 9/1679* (2013.01); *B25J 9/0003* (2013.01); *B25J 9/1697* (2013.01);
(Continued)

(58) Field of Classification Search
USPC .................................................. 700/245–264
See application file for complete search history.

(56) References Cited

U.S. PATENT DOCUMENTS 6,515,586 B1 * 2/2003 Wymore ................ G08B 13/10
702/41
8,108,092 B2 * 1/2012 Phillips ................ G05D 1/0278
701/2
(Continued)

FOREIGN PATENT DOCUMENTS

CN 107440611 A 12/2017

*Primary Examiner* — Jonathan L Sample
(74) *Attorney, Agent, or Firm* — Greenberg Traurig LLP; Nicholas Martin; David J. Dykeman

(57) ABSTRACT

A building monitoring system includes a first sensor configured to detect a first condition in the space, a second sensor configured to detect a second condition in the space, and a robotic sentinel. The robotic sentinel includes a memory for storing one or more rules each configured to identify an alert condition for the space based on the first and/or second conditions in the space, a communications module configured to communicate with a remote device over a network, and a controller operatively coupled to the sensors, the memory, and the communications module. The controller is configured to apply the one or more rules to the first and second detected conditions in the space to identify one or more alert conditions and determine what action is required by the robotic sentinel, and if action is required, command the robotic sentinel to travel to a location of the alert condition.

20 Claims, 10 Drawing Sheets

Related U.S. Application Data continuation of application No. 16/294,889, filed on Mar. 6, 2019, now Pat. No. 11,534,919.

(51) Int. Cl.

| | | |
|---|---|---|
| *B25J 11/00* | (2006.01) |
| *B25J 13/00* | (2006.01) |
| *G08B 5/22* | (2006.01) |
| *G08B 29/04* | (2006.01) |
| *H04L 12/28* | (2006.01) |

(52) U.S. Cl.

CPC ......... *B25J 11/0085* (2013.01); *B25J 13/006* (2013.01); *G08B 5/226* (2013.01); *G08B 29/04* (2013.01); *H04L 12/2825* (2013.01); *H04L 12/2827* (2013.01); *H04L 12/2834* (2013.01)

(56) References Cited

U.S. PATENT DOCUMENTS

| | | | | |
|---|---|---|---|---|
| 9,819,911 | B2 * | 11/2017 | K V | H04N 7/185 |
| 10,137,984 | B1 * | 11/2018 | Flick | G01C 21/00 |
| 10,173,773 | B1 * | 1/2019 | Flick | G08G 5/80 |
| 10,551,810 | B2 * | 2/2020 | Meganathan | G08B 13/181 |
| 10,917,259 | B1 * | 2/2021 | Chein | H04L 12/282 |
| 11,265,516 | B2 * | 3/2022 | Hackert | H04N 7/185 |
| 11,534,919 | B2 * | 12/2022 | Heintzelman | G08B 13/19602 |
| 11,969,901 | B2 | 4/2024 | Heintzelman et al. | |
| 2004/0113777 | A1 * | 6/2004 | Matsuhira | G08B 29/188 |
| | | | | 340/541 |
| 2006/0228106 | A1 * | 10/2006 | Saeki | G05D 1/0242 |
| | | | | 396/427 |
| 2007/0242688 | A1 * | 10/2007 | McFarland | H04L 12/2825 |
| | | | | 455/73 |
| 2007/0279209 | A1 * | 12/2007 | Kogan | B60R 25/1004 |
| | | | | 340/541 |
| 2011/0054689 | A1 * | 3/2011 | Nielsen | G05D 1/0214 |
| | | | | 700/258 |
| 2011/0169612 | A1 * | 7/2011 | Alicot | G06K 7/10009 |
| | | | | 340/10.4 |
| 2012/0154163 | A1 * | 6/2012 | Jones | G08B 13/1418 |
| | | | | 340/657 |
| 2014/0031989 | A1 * | 1/2014 | Bergman | F24F 11/66 |
| | | | | 700/276 |
| 2014/0084165 | A1 * | 3/2014 | Fadell | G01J 5/0806 |
| | | | | 250/340 |
| 2014/0207281 | A1 * | 7/2014 | Angle | B25J 13/006 |
| | | | | 700/257 |
| 2014/0207282 | A1 * | 7/2014 | Angle | B25J 13/006 |
| | | | | 901/1 |
| 2014/0222210 | A1 * | 8/2014 | Agarwal | G05B 15/02 |
| | | | | 700/275 |
| 2014/0266669 | A1 * | 9/2014 | Fadell | G08B 19/00 |
| | | | | 340/501 |
| 2014/0359552 | A1 * | 12/2014 | Misra | H04L 67/10 |
| | | | | 717/100 |
| 2015/0270897 | A1 * | 9/2015 | Sackman | H04B 10/118 |
| | | | | 398/125 |
| 2015/0370272 | A1 * | 12/2015 | Reddy | G05B 17/02 |
| | | | | 700/278 |
| 2016/0121479 | A1 * | 5/2016 | Lin | G05D 1/0282 |
| | | | | 701/2 |
| 2016/0246304 | A1 * | 8/2016 | Canoy | G05D 1/0011 |
| 2016/0341437 | A1 * | 11/2016 | Matsuoka | F24F 11/64 |
| 2017/0003668 | A1 * | 1/2017 | Burt | G05B 19/042 |
| 2017/0172368 | A1 * | 6/2017 | Chiu | A47L 9/2805 |
| 2017/0330466 | A1 * | 11/2017 | Demetriades | G08G 5/57 |
| 2017/0364051 | A1 * | 12/2017 | Kang | G05B 23/0286 |
| 2018/0011463 | A1 * | 1/2018 | Chowdhury | G06Q 10/10 |
| 2018/0068541 | A1 * | 3/2018 | Almomani | G08B 25/10 |

* cited by examiner

400

| Date 402 | Time 404 | Sensor 406 | Sensor Location 408 | Data 410 |
|---|---|---|---|---|
| 7/27/2018 | 12:00pm | Thermostat | Living Room | 68 Degrees |
| 7/27/2018 | 12:00pm | Humidity | Living Room | 45% |
| 7/27/2018 | 12:00pm | CO2 Alarm | Master Bedroom | 400ppm |
| 7/27/2018 | 12:00pm | Leak Detection | Bathroom | None |
| 7/27/2018 | 12:00pm | Fire Alarm | Master Bedroom | No Alert |
| 7/27/2018 | 12:00pm | Motion Detector (living room) | Living Room | No Motion |
| 7/27/2018 | 12:00pm | Motion Detector (kitchen) | Kitchen | No Motion |
| 7/27/2018 | 12:00pm | Motion Detector (front door) | Foyer | No Motion |
| 7/27/2018 | 12:00pm | Air Quality | Living Room | Pollutants Low |
| 7/27/2018 | 12:00pm | Lights | Kitchen | Off |
| 7/27/2018 | 12:00pm | Security | Living Room | Activated |
| - | - | - | | - |
| - | - | - | | - |
| - | - | - | | - |
| - | - | - | | - |

| Time Range | Sensor | Data Range |
|---|---|---|
| Any | Thermostat | 55-85 Degrees |
| Any | Humidity | 30%-70% |
| 10:00am-3:00pm | Motion Detectors | If Motion is Detected |
| Any | Fire Alarm | If Activated |
| Any | CO2 Alarm | If Activated |
| - | - | - |
| - | - | - |
| - | - | - |

SYSTEM AND METHOD FOR LOCATION MONITORING AND EVENT-BASED SENTINEL MANAGEMENT

CROSS-REFERENCE TO RELATED APPLICATIONS

This application claims the benefit of priority from and is a continuation of U.S. Ser. No. 18/058,108, filed on Nov. 22, 2022, which is a continuation of U.S. Ser. No. 16/294,889, filed on Mar. 6, 2019, now U.S. Pat. No. 11,534,919, whereby the contents of which are incorporated in their entirety herein by reference.

TECHNICAL FIELD

The disclosure generally relates to building monitoring systems, and more particularly to systems and methods for monitoring conditions in a building.

BACKGROUND

Building Automation Systems (BAS) and/or various home control systems are used to control one of more functions of a building or home. A Building Automation System and/or a home control system can include, for example, an HVAC system, a lighting control system, a fire suppression systems, a security system, and/or any other suitable building automation system. A Building Automation System and/or home control systems typically include one or more sensors and/or other devices that are operatively coupled to a central controller or the like, often via wireless communication. These sensors and/or devices may be used to monitor parameters within the building or home, including, but not limited to, temperature, humidity, motion, etc.

What would be desirable are improved methods and systems for enhanced building security and data collection.

SUMMARY

This disclosure generally relates to systems and method for enhanced building security and data collection.

In a first example, a method for monitoring a condition in or near building, wherein the building includes one or more sensors each detecting a sensed condition, may comprise storing two or more rules. Each rule may define a rule defined event that is detectable via one or more of the sensed conditions sensed by the one or more of sensors and a recommended action to take in response to the corresponding rule defined event. The method may further comprise monitoring the one or more sensed conditions of the one or more sensors over time and repeatedly applying the two or more rules to the one or more sensed conditions of the one or more sensors to identify a rule defined event of the two or more rules. The recommended action may include deploying a robotic sentinel to a location at or near the sensor having the sensed condition which matched the rule defined event.

Alternatively or additionally to any of the examples above, in another example, the rule defined event for at least one rule may comprise a temperature outside of a predetermined range.

Alternatively or additionally to any of the examples above, in another example, the rule defined event for at least one rule may comprise an activated motion detector during a predefined time period.

Alternatively or additionally to any of the examples above, in another example, the rule defined event for at least one rule may comprise a humidity outside of a predetermined range.

Alternatively or additionally to any of the examples above, in another example, the rule defined event for at least one rule may comprise an activated fire alarm.

Alternatively or additionally to any of the examples above, in another example, the rule defined event for at least one rule may comprise an activated gas detector.

Alternatively or additionally to any of the examples above, in another example, the rule defined event for at least one rule may comprise an activated leak detector.

Alternatively or additionally to any of the examples above, in another example, when the robotic sentinel arrives at the location at or near the sensor or device which matched the rule defined event, the robotic sentinel may poll the sensor or device for updated data.

Alternatively or additionally to any of the examples above, in another example, if the updated data of the sensor or device matches the rule defined event, a camera on the robotic sentinel may be activated.

Alternatively or additionally to any of the examples above, in another example, the method may further comprise transmitting a video feed from the robotic sentinel to a remote device over a network.

Alternatively or additionally to any of the examples above, in another example, the method may further comprise saving the video feed as a data file.

Alternatively or additionally to any of the examples above, in another example, the recommended action may further comprise delivering an alert to a remote device over a network.

Alternatively or additionally to any of the examples above, in another example, the method may further comprise the robotic sentinel may be a robotic vacuum.

In another example, a building monitoring system configured to be used in a space within a building may comprise a first sensor configured to detect a first condition in the space, a second sensor configured to detect a second condition in the space, and a robotic sentinel. The robotic sentinel may comprise a memory for storing one or more rules each configured to identify an alert condition for the space based on the first and/or second conditions in the space, a communications module configured to communicate with a remote device over a network, and a controller operatively coupled to the first sensor, the second sensor, the memory, and the communications module. The controller may be configured to apply the one or more rules to the first and second detected conditions in the space to identify one or more alert conditions and determine what, if any, action is required by the robotic sentinel, and if action is required, command the robotic sentinel to travel to a location of the alert condition.

Alternatively or additionally to any of the examples above, in another example, the controller may be further configured to provide an alert to the remote device via the communications module.

Alternatively or additionally to any of the examples above, in another example, the controller may be configured to activate a camera mounted on the robotic sentinel at the location of the alert condition.

Alternatively or additionally to any of the examples above, in another example, a video feed acquired from the camera may be transmitted to the remote device.

Alternatively or additionally to any of the examples above, in another example, the robotic sentinel may be a robotic vacuum.

In another example, a server for monitoring a space of a building may comprise a memory for storing two or more rules. Each rule may define a rule defined event that is detectable via one or more of sensed conditions in the space and a recommended action to take in response to the corresponding rule defined event. The server may further comprise an input/output port for receiving one or more sensed conditions from the space and a controller operatively coupled memory and the input/output port. The controller may be configured to monitor the one or more sensed conditions over time, repeatedly applying the two or more rules to the one or more monitored sensed conditions to identify when a rule defined event of the two or more rules occurs, and perform the recommended action defined by the rule that resulted in the rule defined event. The recommended action may comprise deploying a robotic sentinel within the space to a location that includes the sensed condition which matches the rule defined event.

Alternatively or additionally to any of the examples above, in another example, the one or more sensed conditions may comprise uncomfortable or unsafe conditions, and wherein the rule defined event for a first rule of the two or more rules may comprise a temperature outside of a predetermined range and a second rule of the two or more rules may comprise an activated motion detector.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 7 is an illustrative sensor database;

FIG. 8 is an illustrative system rules database;

Figure 1:
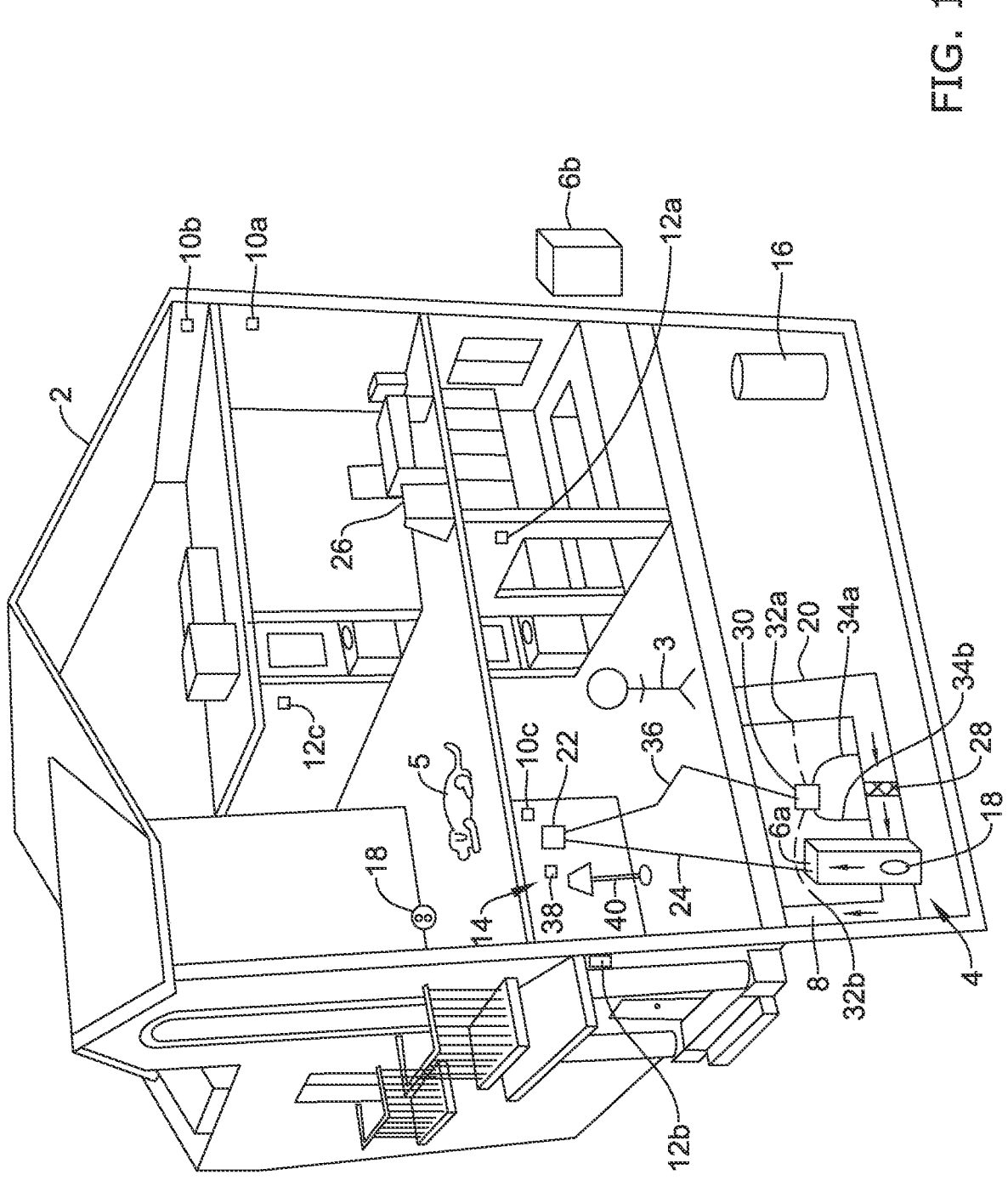
FIG. 1 is a schematic view of an illustrative building including various home automation systems.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION OF EMBODIMENTS

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

This disclosure generally relates to building and/or home automation systems, and more particularly to enhanced security and data collection throughout the building and/or home automation system. For clarity, the following description will be described with respect to a home automation system including a comfort system (e.g., an HVAC system), a security system, and/or any number of Internet of Things (IoT) devices (e.g., household devices having built-in wireless connectivity, sometimes called "smart" devices or "connected" devices), however the systems and methods described herein may be applied to commercial buildings, hotels, apartment buildings, etc. The home automation system may include one or more of an HVAC system, a lighting control system, a fire suppression system, a security system, and any other suitable home automation system devices.

FIG. 1 is a schematic view of a building 2 having an illustrative heating, ventilation, and air conditioning (HVAC) system 4 and an illustrative security system 14. The building 2 may be routinely occupied by a person or people 3 and, in some cases, one or more pets 5. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6a, 6b (collectively, 6), a system of ductwork and air vents including a supply air duct 8 and a return air duct 20, and one or more controllers 22. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

The illustrative HVAC system 4 may further include one or more sensors or devices 10a, 10b (collectively, 10) configured to measure a parameter of the environment to be controlled. The one or more sensors or devices 10 may include, but are not limited to, temperatures sensors, humidity sensors, carbon dioxide sensors, occupancy sensors, proximity sensors, etc. Each of the sensor/devices 10 may be operatively connected to the controller 22 via a corresponding communications port (not explicitly shown). It is contemplated that the communications port may be wired and/or wireless. When the communications port is wireless, the communications port may include a wireless transceiver, and the controller 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

It is contemplated that the controller(s) 22 may be configured to control the comfort level in the building or structure by activating and deactivating the HVAC component(s) 6 in a controlled manner. The controller(s) 22 may be configured to control the HVAC component(s) 6 via a wired or wireless communication link 24. In some cases, the controller(s) 22 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the controller(s) 22 may be a zone controller, or may include multiple zone controllers each monitoring and/or controlling the comfort level within a particular zone in the building or other structure. As will be described in more detail herein, the controller(s) 22 may be configured to control the security system and/or other home automation devices or to communicate with separate controllers dedicated to the security system and/or other home automation devices.

In the illustrative HVAC system 4 shown in FIG. 1, the HVAC component(s) 6 may provide heated air (and/or cooled air) via the ductwork throughout the building 2. While not explicitly shown, the HVAC component(s) 6 may be in fluid communication with every room and/or zone in the building 2 via the ductwork 8 and 20, but this is not required. In operation, when a heat call signal is provided by the controller(s) 22, an HVAC component 6a (e.g., forced warm air furnace) may be activated to supply heated air to one or more rooms and/or zones within the building 2 via supply air ducts 8. The heated air may be forced through supply air duct 8 by a blower or fan 17. In this example, the cooler air from each zone may be returned to the HVAC component 6 (e.g. forced warm air furnace) for heating via return air ducts 20. Similarly, when a cool call signal is provided by the controller(s) 22, an HVAC component 6b (e.g. air conditioning unit) may be activated to supply cooled air to one or more rooms and/or zones within the building or other structure via supply air ducts 8. The cooled air may be forced through supply air duct 8 by the blower or fan 17. In this example, the warmer air from each zone may be returned to the HVAC component 6b (e.g., air conditioning unit) for cooling via return air ducts 20. In some cases, the HVAC system 4 may include an internet gateway or other device 26 that may allow one or more of the HVAC components, as described herein, to communicate over a wide area network (WAN) such as, for example, the Internet.

In some cases, the system of vents or ductwork 8 and/or 20 can include one or more dampers (not explicitly shown) to regulate the flow of air, but this is not required. For example, one or more dampers may be coupled to one or more controller(s) 22, and can be coordinated with the operation of one or more HVAC components 6. The one or more controller(s) 22 may actuate dampers to an open position, a closed position, and/or a partially open position to modulate the flow of air from the one or more HVAC components 6 to an appropriate room and/or zone in the building or other structure. The dampers may be particularly useful in zoned HVAC systems, and may be used to control which zone(s) receives conditioned air from the HVAC component(s) 6.

In many instances, one or more air filters 28 may be used to remove dust and other pollutants from the air inside the building 2. In the illustrative example shown in FIG. 1, the air filter(s) 30 is installed in the return air duct 20, and may filter the air prior to the air entering the HVAC component 6, but it is contemplated that any other suitable location for the air filter(s) 30 may be used. The presence of the air filter(s) 28 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 30. When provided, the equipment interface module 30 may, in addition to controlling the HVAC under the direction of the thermostat, be configured to measure or detect a change in a given parameter between the return air side and the discharge air side of the HVAC system 4. For example, the equipment interface module 30 may measure a difference in temperature, flow rate, pressure, or a combination of any one of these parameters between the return air side and the discharge air side of the HVAC system 4. In some cases, the equipment interface module 30 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 30 may include a first temperature sensor 32a located in the return (incoming) air duct 20, and a second temperature sensor 32b located in the discharge (outgoing or supply) air duct 8. Alternatively, or in addition, the equipment interface module 34 may include a differential pressure sensor including a first pressure tap 34a located in the return (incoming) air duct 20, and a second pressure tap 34b located downstream of the air filter 28 to measure a change in a parameter related to the amount of flow restriction through the air filter 28. In some cases, the equipment interface module 30, when provided, may include at least one flow sensor that is capable of providing a measure that is related to the amount of air flow restriction through the air filter 28. In some cases, the equipment interface module 34 may include an air filter monitor. These are just some examples.

When provided, the equipment interface module 30 may be configured to communicate with the controller 22 via, for example, a wired or wireless communication link 36. In other cases, the equipment interface module 30 may be incorporated or combined with the HVAC controller 22. In either case, the equipment interface module 30 may communicate, relay or otherwise transmit data regarding the selected parameter (e.g. temperature, pressure, flow rate, etc.) to the controller 22. In some cases, the controller 22 may use the data from the equipment interface module 30 to evaluate the system's operation and/or performance. For example, the controller 22 may compare data related to the difference in temperature (delta T) between the return air side and the discharge air side of the HVAC system 4 to a previously determined delta T limit stored in the controller 22 to determine a current operating performance of the HVAC system 4.

The illustrative security system 14 may include a central controller 38 and a number of sensors/devices 12a, 12b, 12c (collectively, 12). While the security system controller 38 is illustrated as a separate controller from the HVAC controller 22, it is contemplated that the security system controller 38 and the HVAC controller 22 may be provided as a single controller which communicates with and controls both the HVAC system 4 and the security system 14. The sensor/devices 12 may be configured to detect threats within and/or around the building 2. In some cases, some of the sensor/devices 12 may be constructed to detect different threats. For example, some of the sensor/devices 12 may be limit switches located on doors and windows of the building 2, which are activated by entry of an intruder into the building 2 through the doors and windows. Other suitable security sensor/devices 12 may include fire, smoke, water, carbon monoxide, and/or natural gas detectors, to name a few. Still other suitable security system sensor/devices 12 may include motion sensors that detect motion of intruders in the building 2 or noise sensors or microphones that detect the sound of breaking glass. It is contemplated that the motion sensor may be passive infrared (PIR) motion sensors, a microwave motion sensor, an ultrasonic motion sensor, a tomographic motion sensor, a video camera having motion detection software, a vibrational motion sensor, etc. In some cases, one or more of the sensor/devices 12 may include a video camera. In some cases, the sensor/devices 12 may include a horn or alarm, a damper actuator controller (e.g. that closes a damper during a fire event), a light controller for automatically turning on/off lights to simulate occupancy, and/or any other suitable device/sensor. These are just examples. More generally, the sensor/devices 12 may be any type of sensor or device suitable for operation in a building automation system.

During operation of the illustrative security system 14, the central controller 38 monitors the status of each of the sensor/devices 12. Upon detecting a change of status in one of the sensor/devices 12, the central controller may activate an alarm device, record and/or transmit live video from one of the sensor/devices 12, operate an actuator, contact an off-site central monitoring station (not shown), and/or perform any other suitable action.

Each of the sensor/devices 12 may be operatively connected to the central controller 38 via a corresponding communications port (not explicitly shown). It is contemplated that the communications port may be wired and/or wireless. When the communications port is wireless, the communications port may include a wireless transceiver, and the central controller 38 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The building 2 may be further provided with additional network connected or "smart" devices (e.g., WiFi enabled), also known as Internet of Things (IoT) devices. These devices may include lighting 40, home appliances 18 (such as, but not limited to, robotic vacuums, coffee pots, etc.), water heaters 16, voice activated smart speakers (e.g., AMAZON ECHO™ or GOOGLE HOME™), WiFi enabled power outlets, garage door openers, door locks, televisions, speakers, doorbells, water valves, video cameras, wearable devices, etc. Other devices in the building 2 may include, but are not limited to, a radiofrequency receiver, a thermal imager, a radar device, a lidar device, an ultrasound device, etc. It is contemplated that the additional network connected devices may be in communication with or configured to communicate or interface with the HVAC controller 22 and/or the central security controller 38. In some instances, the additional network connected devices may have one or more individual controllers which in turn communicate with the HVAC controller and/or the security controller 38.

Figure 2:
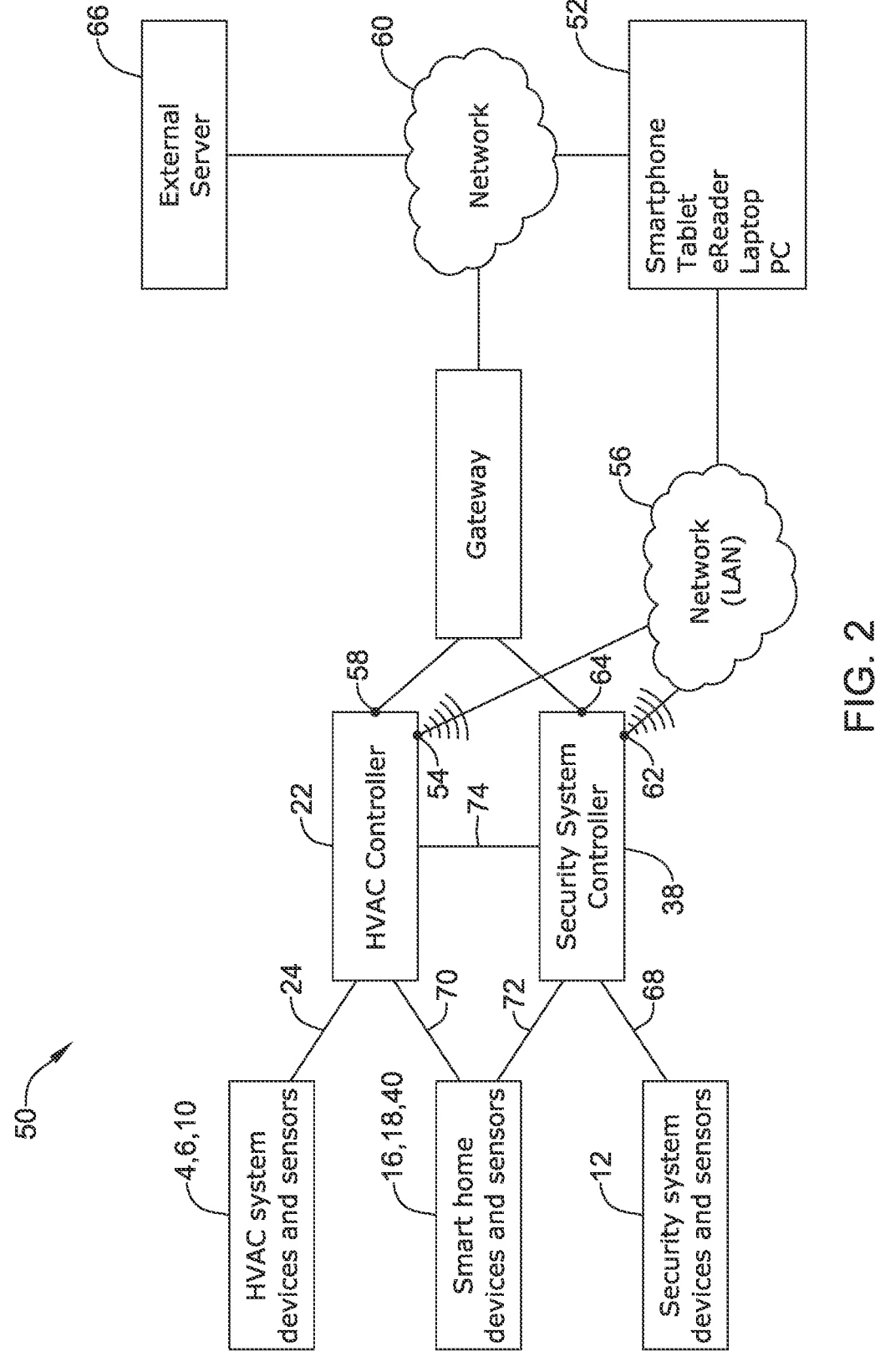
FIG. 2 is a schematic block diagram of an illustrative home or building automation system in communication with illustrative external devices and networks.

FIG. 2 is a schematic view of a home automation system 50 that facilitates remote access to, control of, and/or external communication to/from the HVAC system 4, the security system 14, and/or other home automation devices 16, 18, 40 shown in FIG. 1. The home automation system 50 may be considered a building control system or part of a building control system. The illustrative home automation system 50 includes an HVAC controller, for example, controller 22 (see FIG. 1), that is configured to communicate with and control one or more HVAC components 6 of the HVAC system 4 and a security system controller 38 (see FIG. 1) that is configured to communicate with and control one or more security sensors and/or devices 12. As discussed above, the controllers 22, 38 may be provided as separate and discrete control units or combined into a single control unit, as desired. Further, while not explicitly shown, the smart home devices and sensors 16, 18, 40 may communicate with control programs or controllers which in turn communicate with the HVAC controller 22 and/or security system controller 38. Alternatively, the smart home devices and sensors 16, 18, 40 may be configured to communicate directly with the HVAC controller 22 and/or security system controller 38.

The HVAC controller 22 may communicate with the one or more HVAC components 6 of the HVAC system 4 via a wired or wireless link 24 and with the smart home devices and sensors 16, 18, 40 (and/or the control programs thereof) via a wired or wireless link 70. Similarly, the security system controller 38 may communicate with one or more security sensors and/or devices 12 via a wired or wireless link 68 and with the smart home devices and sensors 16, 18, 40 (and/or the control programs thereof) via a wired or wireless link 72. If provided separately, it is not required for both the HVAC controller 22 and the security system controller 38 to be in communication with the smart home devices and sensors 16, 18, 40 (and/or the control programs thereof). For example, the HVAC controller 22 and the security system controller 38 may be in communication with one another via a wired or wireless link 74 such that information may be passed between the HVAC controller 22 and the security system controller 38.

Additionally, the controllers 22, 38 may communicate over one or more wired or wireless networks that may accommodate remote access and/or control of the controllers 22, 38 via another device 52 such as a smart phone, tablet, e-reader, laptop computer, personal computer, key fob, or the like. As shown in FIG. 2, the HVAC controller 22 may include a first communications port 54 for communicating over a first network 56, and in some cases, a second communications port 58 for communicating over a second network 60. Similarly, the security system controller 38 may include a first communications port 62 for communicating over the first network 56, and in some cases, a second communications port 64 for communicating over the second network 60. In some cases, the first network 56 may be a wireless local area network (LAN), and the second network 60 (when provided) may be a wide area network or global network (WAN) including, for example, the Internet. In some cases, the wireless local area network 56 may provide a wireless access point and/or a network host device that is separate from the controllers 22, 38. In other cases, the wireless local area network 56 may provide a wireless access point and/or a network host device that is part of at least one of the controller 22, 38. In some cases, the wireless local area network 56 may include a local domain name server (DNS), but this is not required for all embodiments. In some cases, the wireless local area network 56 may be an ad-hoc wireless network, but this is not required.

In some cases, the controllers 22, 38 may be programmed to communicate over the second network 60 with an external web service hosted by one or more external web servers 66. A non-limiting example of such an external web service is Honeywell's LCBS Connect™ web service. The controllers 22, 38 may be configured to upload selected data via the second network 60 to the external web service 66 where it may be collected, stored, and/or analyzed on the external web server 66. In some cases, the data may be indicative of the performance of the HVAC system 4, the security system 14, and/or the smart home devices and sensors 16, 18, 40. In other cases, the data may be indicative of building activity or lack thereof. Additionally, the controllers 22, 38 may be configured to receive and/or download selected data, settings, and/or services sometimes including software updates from the external web service over the second network 60. The data, settings and/or services may be received automatically from the web service, downloaded periodically in accordance with a control algorithm, and/or downloaded in response to a user request. In some cases, for example, the HVAC controller 22 may be configured to receive and/or download an HVAC operating schedule and operating parameter settings such as, for example, temperature set points, humidity set points, start times, end times, schedules, window frost protection settings, and/or the like from the web server 66 over the second network 60. In some instances, the controllers 22, 38 may be configured to receive one or more user profiles having at least one operational parameter setting that is selected by and reflective of a user's preferences. In still other instances, the controllers 22, 38 may be configured to receive and/or download firmware and/or hardware updates such as, for example, device drivers from the web server 66 over the second network 60. Additionally, the controllers 22, 38 may be configured to receive local weather data, weather alerts and/or warnings, major stock index ticker data, and/or news headlines over the second network 60. These are just some examples.

Depending upon the application and/or where the home automation user is located, remote access and/or control of the controllers 22, 38 may be provided over the first network 56 and/or the second network 60. A variety of remote wireless devices 52 may be used to access and/or control the controllers 22, 38 from a remote location (e.g. remote from the controllers 22, 38) over the first network 56 and/or second network 60 including, but not limited to, mobile phones including smart phones, tablet computers, laptop or personal computers, wireless network-enabled key fobs, e-readers, and/or the like. In many cases, the remote wireless devices 52 are configured to communicate wirelessly over the first network 56 and/or second network 60 with the controllers 22, 38 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, one or more application program codes (i.e., apps) stored in the memory of the remote device 52 may be used to remotely access and/or control the controllers 22, 38. Similarly, an application program code (app) may be used to remotely access and/or control the smart home devices and sensors 16, 18, 40. The application program code (app) may be provided for downloading from an external web service, such as the web service hosted by the external web server 66 (e.g., Honeywell's LCBS Connect™ web service) or another external web service (e.g., ITUNES® or Google Play). In some cases, the app may provide a remote user interface for interacting with the controllers 22, 38 and/or smart home devices and sensors 16, 18, 40 at the user's remote device 52. For example, through the user interface provided by the app(s), a user may be able to change the operating schedule and operating parameter settings such as, for example, temperature set points, humidity set points, start times, end times, schedules, window frost protection settings, accept software updates and/or the like. Additionally, through the user interface provided by the app(s) the user may be able to arm and/or disarm the security system 14, view sensor status, view live or previously captured videos or still images and/or the like. Further, through the user interface provided by the app(s) the user may be able to view the status of the smart home devices and sensors 16, 18, 40, change a state of the smart home devices and sensors 16, 18, 40 (e.g., turn on/off), change a control parameter (e.g., a water heater temperature set point), and/or the like.

Communications may be routed from the user's remote device 52 to the web server 66 and then, from the web server 66 to the appropriate controller 22, 38. In some cases, communications may flow in the opposite direction such as, for example, when a user interacts directly with the controllers 22, 38 to change an operating parameter setting such as, for example, a schedule change or a set point change, or an association of a security system sensor 12 with an arming mode, etc. The change made at the appropriate controller 22, 38 may then be routed to the web server 66 and then from the web server 66 to the remote device 52 where it may reflected by the application program(s) executed by the remote device 52. In some cases, one or both controllers 22, 38 may be used to change an operating parameter in the smart home devices and sensors 16, 18, 40.

In other cases, a user may be able to interact with the controllers 22, 38 via a user interface provided by one or more web pages served up by the web server 66. The user may interact with the one or more web pages using a variety of internet capable devices to effect a change at the controllers 22, 38 as well as view usage data and energy consumption date related to the usage of the HVAC system 4, security events or status related to the security system 12, and/or information regarding the smart home devices and sensors. In still yet another case, communication may occur between the user's remote device 52 and the controllers 22, 38 without being relayed through a server. These are just some examples.

Figure 3:
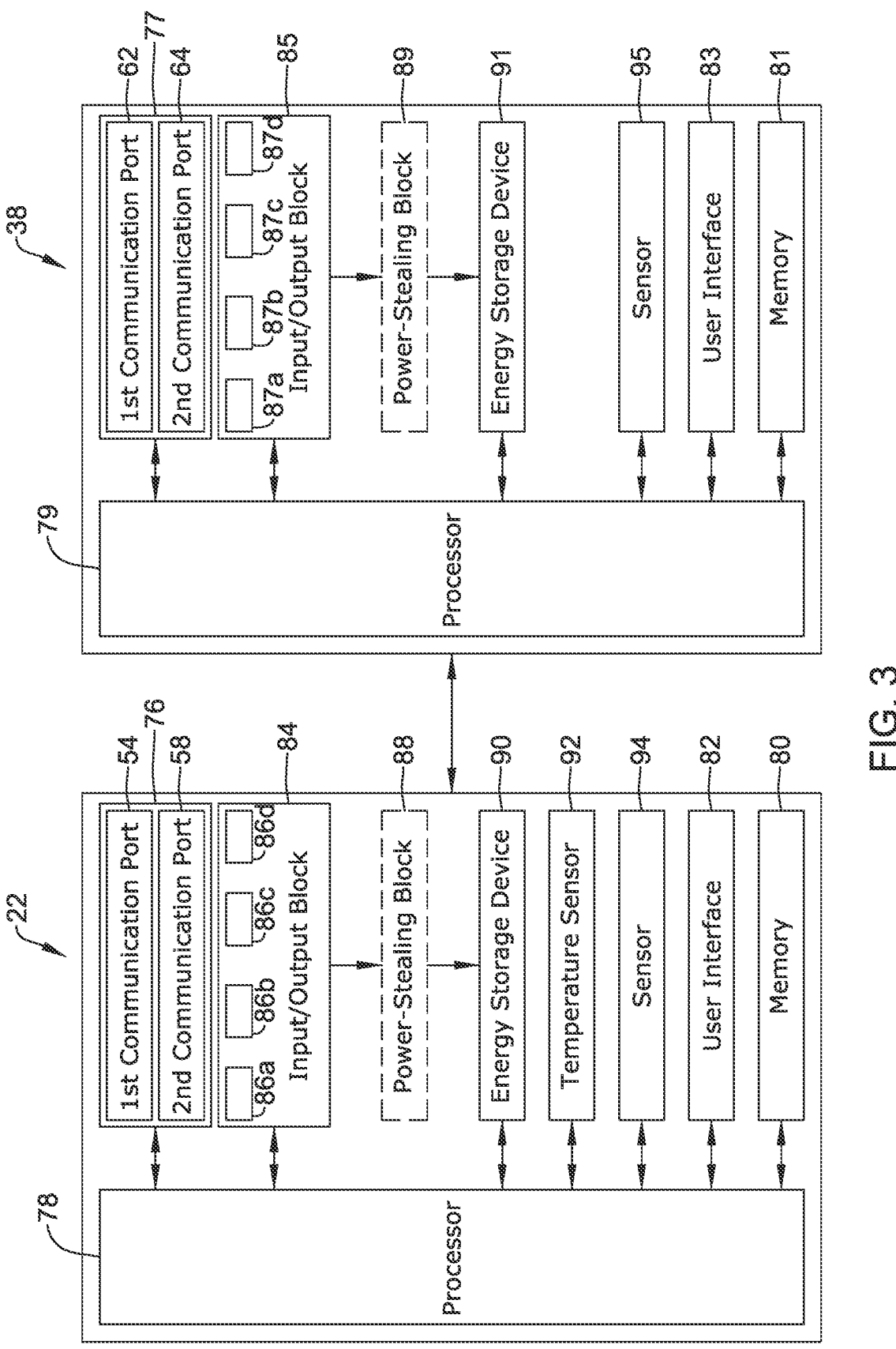
FIG. 3 is a schematic block diagram of first and second illustrative controllers.

FIG. 3 is an illustrative schematic block diagram of the HVAC controller 22 in communication with the security system controller 38 of FIG. 2. As discussed above with reference to FIG. 2, the HVAC controller 22 and/or the security system controller 38 may be accessed and/or controlled from a remote location over the first network 56 and/or the second network 60 using a remote wireless device 52 such as, for example, a smart phone, a tablet computer, a laptop or personal computer, a wireless network-enabled key fob, an e-reader, and/or the like. In some instances, the HVAC controller 22 may be a thermostat, but this is not required. As shown in FIG. 3, the HVAC controller 22 and the security system controller 38 may each include a communications block 76, 77 having a first communications port 54, 62 for communicating over a first network (e.g., a wireless LAN) and a second communications port 58, 64 for communicating over a second network (e.g., a WAN or the Internet). The first communications port 54, 62 can be a wireless communications port including a wireless transceiver for wirelessly sending and/or receiving signals over a first wireless network 56. Similarly, the second communications port 58, 64 may be a wireless communications port including a wireless transceiver for sending and/or receiving signals over a second wireless network 60. In some cases, the second communications port 58, 64 may be in communication with a wired or wireless router or gateway for connecting to the second network, but this is not required. In some cases, the router or gateway may be integral to (e.g., within) the HVAC controller 22 and/or the security system controller 38 or may be provided as a separate device. Additionally, the illustrative HVAC controller 22 and the security system controller 38 may each include a processor (e.g., microprocessor, microcontroller, etc.) 78, 79 and a memory 80, 81. The HVAC controller 22 and the security system controller 38 may each also include a user interface 82, 83, but this is not required. In some cases, only one of the HVAC controller 22 or the security system controller 38 may be provided with a user interface 82, 83. In some cases, one or both of the HVAC controller 22 and the security system controller 38 may include a timer (not shown). The timer may be integral to the processor 78, 79 or may be provided as a separate component. The respective memory 80, 81 of the illustrative HVAC controller 22 and the security system controller 38 may be in communication with the respective processor 78, 79. The memory 80, 81 may be used to store any desired information, such as the aforementioned control algorithm, set points, schedule times, diagnostic limits such as, for example, differential pressure limits, delta T limits, security system arming modes, and the like. The memory 80, 81 may be any suitable type of storage device including, but not limited to, RAM, ROM, EPROM, flash memory, a hard drive, and/or the like. In some cases, the processor 78, 79 may store information within the memory 80, 81, and may subsequently retrieve the stored information from the memory 80, 81.

In many cases, the HVAC controller 22 may include an input/output block (I/O block) 84 having a number of wire terminals (e.g. 86a-86d) for receiving one or more signals from the HVAC system 4 and/or for providing one or more control signals to the HVAC system 4. For example, the I/O block 84 may communicate with one or more HVAC components 6 of the HVAC system 4. The HVAC controller 22 may have any number of wire terminals for accepting a connection from one or more HVAC components 6 of the HVAC system 4. However, how many wire terminals are utilized and which terminals are wired is dependent upon the particular configuration of the HVAC system 4. Different HVAC systems 4 having different HVAC components and/or type of HVAC components 6 may have different wiring configurations. As such, an I/O block 84 having four wire terminals, as shown in FIG. 3, is just one example and is not intended to be limiting. In some cases, the I/O block 84 may be configured to receive wireless signals from one or more HVAC components 6 or sensors 10. Alternatively, or in addition to, the I/O block 84 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device. It is further contemplated that the I/O block 84 may communicate with another controller which controls a separate building control system, such as, but not limited to the security system controller 38.

Similarly, the security system controller 38 may include an input/output block (I/O block) 85 having a number of wire terminals (e.g. 87a-87d) for receiving one or more signals from the security system 12 and/or for providing one or more control signals to the security system 12. For example, the I/O block 85 may communicate with one or more sensors 12 of the security system 14. The security system controller 38 may have any number of wire terminals for accepting a connection from one or more sensors 12 of the security system 14. However, how many wire terminals are utilized and which terminals are wired is dependent upon the particular configuration of the security system 14. As such, an I/O block 85 having four wire terminals, as shown in FIG. 3, is just one example and is not intended to be limiting. In some cases, the I/O block 85 may be configured to receive wireless signals from one or more security sensors 12. Alternatively, or in addition to, the I/O block 85 may communicate with another controller, which is in communication with one or more controllers which controls a separate building control system, such as, but not limited to the HVAC controller 22.

In some cases, a power-transformation block 88, 89 may be connected to one or more wires of the I/O block 84, 85, and may be configured to bleed or steal energy from the one or more wires of the I/O block 84, 85. The power bled off of the one or more wires of the I/O block may be stored in an energy storage device 90, 91 that may be used to at least partially power the HVAC controller 22 or the security system controller 38. In some cases, the energy storage device 90, 91 may be capacitor or a rechargeable battery. In addition, the HVAC controller 22 and/or the security system controller 38 may also include a back-up source of energy such as, for example, a battery that may be used to supplement power supplied to the HVAC controller 22 or the security system controller 38 when the amount of available power stored by the energy storage device 90, 91 is less than optimal or is insufficient to power certain applications. Certain applications or functions performed by the HVAC controller 22 or the security system controller 38 may require a greater amount of energy than others. If there is an insufficient amount of energy stored in the energy storage device 90, 91, then, in some cases, certain applications and/or functions may be prohibited by the processor 78, 79.

The HVAC controller 22 may also include one or more sensors such as for example, a temperature sensor, a humidity sensor, an occupancy sensor, a proximity sensor, and/or the like. In some cases, the HVAC controller 22 may include an internal temperature sensor 92, as shown FIG. 3, but this is not required. The HVAC controller 22 may also communicate with one or more remote temperature sensors, humidity sensors, and/or occupancy sensors 10 located throughout the building or structure. Additionally, the HVAC controller may communicate with a temperature sensor and/or humidity sensor located outside of the building or structure for sensing an outdoor temperature and/or humidity if desired.

In some cases, the HVAC controller 22 may include a sensor 94 that is configured to determine if a user is in proximity to the building controller. Similarly, the security system controller 38 may include a sensor 95 that is configured to determine if a user is in proximity to the security system controller 38. In some cases, the sensor 94, 95 may be a motion sensor or a proximity sensor such as, for example, a passive infrared (PIR) sensor. In certain cases in which the sensor 94, 95 is a motion sensor or a proximity sensor, the sensor 94, 95 may be located remotely from the HVAC controller 22 and/or the security system controller 38 and may be in wireless communication with the HVAC controller 22 and/or the security system controller 38 via one of the communication ports.

In yet another example, the sensor 94, 95 may be configured to determine that the user is in proximity to or is expected to be in proximity to the HVAC controller 22 and/or the security system controller 38 upon detecting that the user's remote device 52 is connected to the building's wireless network which, in some cases, may be the same network to which the HVAC controller 22 and/or the security system controller 38 is also connected. Such functionality is shown and described in U.S. Patent Publication No. 2014/0031989 entitled "HVAC CONTROLLER WITH WIRELESS NETWORK BASED OCCUPANCY DETECTION AND CONTROL", the entirety of which is incorporated by reference herein for all purposes.

In still other cases, the user's remote device 52 may be configured to determine that a user is in proximity to the HVAC controller 22 and/or the security system controller 38 upon sensing a user's interaction with the HVAC controller 22 and/or the security system controller 38 via the user interface provided at the HVAC controller 22 and/or the security system controller 38. For example, the sensor 94, 95 may be configured to sense when the screen of the user interface 82, 83 is touched and/or when a button provided at the user interface 82, 83 is pressed by a user. In some cases, the sensor 94, 95 may be a touch sensitive region provided on the user interface 82, 83 when the user interface 82, 83 incorporates a touch screen display. In other cases, the sensor 94, 95 may be associated with a hard button or soft key that is provided separate from a display of the user interface 82, 83.

In some cases, upon detecting or determining that a user is in proximity to the HVAC controller 22 and/or the security system controller 38, the sensor 94,95 may deliver a signal to the processor 78, 79 indicating that the user is in proximity to the HVAC controller 22 or the security system controller 38. In other cases, upon detecting or determining that a user is in proximity to the HVAC controller 22 or the security system controller 38, the sensor 94, 95 may be configured to transmit a signal to a remote server 66 over a second network 60 via the communications block 76, 77.

The user interface 82, 83, when provided, may be any suitable user interface that permits the HVAC controller 22 or the security system controller 38 to display and/or solicit information, as well as accept one or more user interactions with the HVAC controller 22 or the security system controller 38. For example, the user interface 82, 83 may permit a user to locally enter data such as temperature set points, humidity set points, starting times, ending times, schedule times, diagnostic limits, responses to alerts, associate sensors to alarming modes, and the like. In one example, the user interface 82, 83 may be a physical user interface that is accessible at the HVAC controller 22 or the security system controller 38, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface 82, 83 may be a touch screen LCD panel that functions as both display and keypad. The touch screen LCD panel may be adapted to solicit values for a number of operating parameters and/or to receive such values, but this is not required. In still other cases, the user interface 82, 83 may be a dynamic graphical user interface.

In some instances, the user interface 82, 83 need not be physically accessible to a user at the HVAC controller 22 or the security system controller 38. Instead, the user interface 82, 83 may be a virtual user interface 82, 83 that is accessible via the first network 56 and/or second network 60 using a mobile wireless device such as one of those remote devices 52 previously described herein. In some cases, the virtual user interface 82, 83 may be provided by an app or apps executed by a user's remote device for the purposes of remotely interacting with the HVAC controller 22 or the security system controller 38. Through the virtual user interface 82, 83 provided by the app on the user's remote device 52, the user may change temperature set points, humidity set points, starting times, ending times, schedule times, diagnostic limits, respond to alerts, update their user profile, view energy usage data, arm or disarm the security system, configured the alarm system, and/or the like. In some instances, changes made to the HVAC controller 22 or the security system controller 38 via a user interface 82, 83 provided by an app on the user's remote device 52 may be first transmitted to an external web server 66. The external web server 66 may receive and accept the user inputs entered via the virtual user interface 82, 83 provided by the app on the user's remote device 52, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

Rather than a dedicated app, the virtual user interface 82, 83 may include one or more web pages that are transmitted over the second network 60 (e.g. WAN or the Internet) by an external web server (e.g. web server 66). The one or more web pages forming the virtual user interface 82, 83 may be hosted by an external web service and associated with a user account having one or more user profiles. The external web server 66 may receive and accept user inputs entered via the virtual user interface and associate the user inputs with a user's account on the external web service. If the user inputs include changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

In some cases, a user may use either the user interface 82, 83 provided at the HVAC controller 22 or the security system controller 38 and/or a virtual user interface 82, 83 as described herein. The two types of user interfaces 82, 83 that may be used to interact with the HVAC controller 22 or the security system controller 38 are not mutually exclusive of one another. However, in some cases, a virtual user interface 82, 83 may provide more advanced capabilities to the user. It is further contemplated that a same virtual user interface 82, 83 for both the HVAC controller 22 and the security system controller 38. Further, as described above, the HVAC controller 22 and the security system controller 38 may be formed as a single controller configured to perform the functions of both the HVAC controller 22 and the security system controller 38 from a single device.

Figure 4:
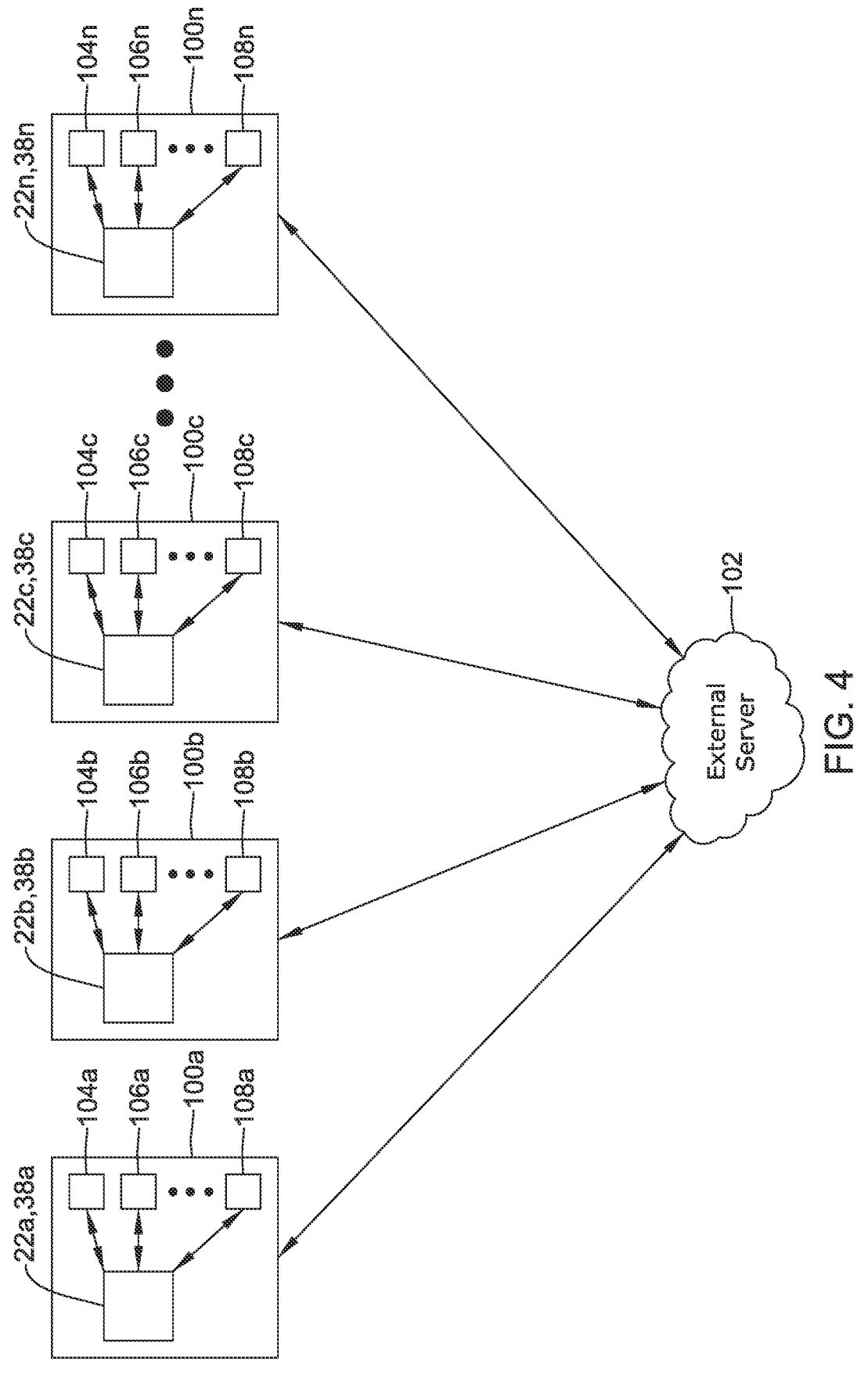
FIG. 4 is a schematic block diagram of a plurality of controllers in communication with an external server.

FIG. 4 is a schematic diagram of a plurality of buildings 100*a*, 100*b*, 100*c*, 100*n* (collectively, 100) each having one or more HVAC controllers 22*a-n* and/or security system controllers 38*a-n* in communication with an external web server 102, such as the external web server 66 described herein. It is contemplated that devices from any number of buildings 100 may be providing information to the external server 102. In some cases, hundreds, thousands, tens of thousands, or more buildings may be in communication with the external web server 102. The buildings 100*a-n* may each have one or more of: an HVAC system 104*a-n*, a security system 106*a-n*, or a smart home device, appliance, or sensor 108*a-n* such as any of those described above with respect to FIG. 1. The HVAC system 104*a-n*, security system 106*a-n*, and/or smart home devices 108*a-n* may be in communication with the HVAC controller 22*a-n*, security system controller 38*a-n*, a combined HVAC and security controller, or other controller configured to operate the systems and devices within the respective building 102*a-n*. The controllers 22*a-n*, 38*a-n* from each building may then relay performance data, operating parameters, alarm conditions, gas and/or electricity usage, etc. to the external server 102. In some cases, the data may be relayed through a WAN to the external server 102. In some cases, the external server 102 may be configured to aggregate the data obtained from the individual buildings 100. As will be described in more detail herein, once aggregated, the data can be analyzed for trends, to identify outliers, to improve algorithms, etc.

It is contemplated that the HVAC sensors 10, security system sensors 12, and/or smart home devices and sensors 16, 18, 40 may be utilized with a security sentinel system to enhance home security and data collection. Generally, the security sentinel may provide sensor feedback to connected devices in the home (or building) such as thermostats, humidifiers, motion sensors, etc. and may also become a signal booster for Wi-Fi in the home. The security sentinel may also respond to alerts from connected home devices by traveling to a location inside the home where the alert originated and collecting more sensor data, activating a camera, and allowing the user to view the situation in real-time or providing a report back to the user if they are unable to view a video stream.

Figure 5:
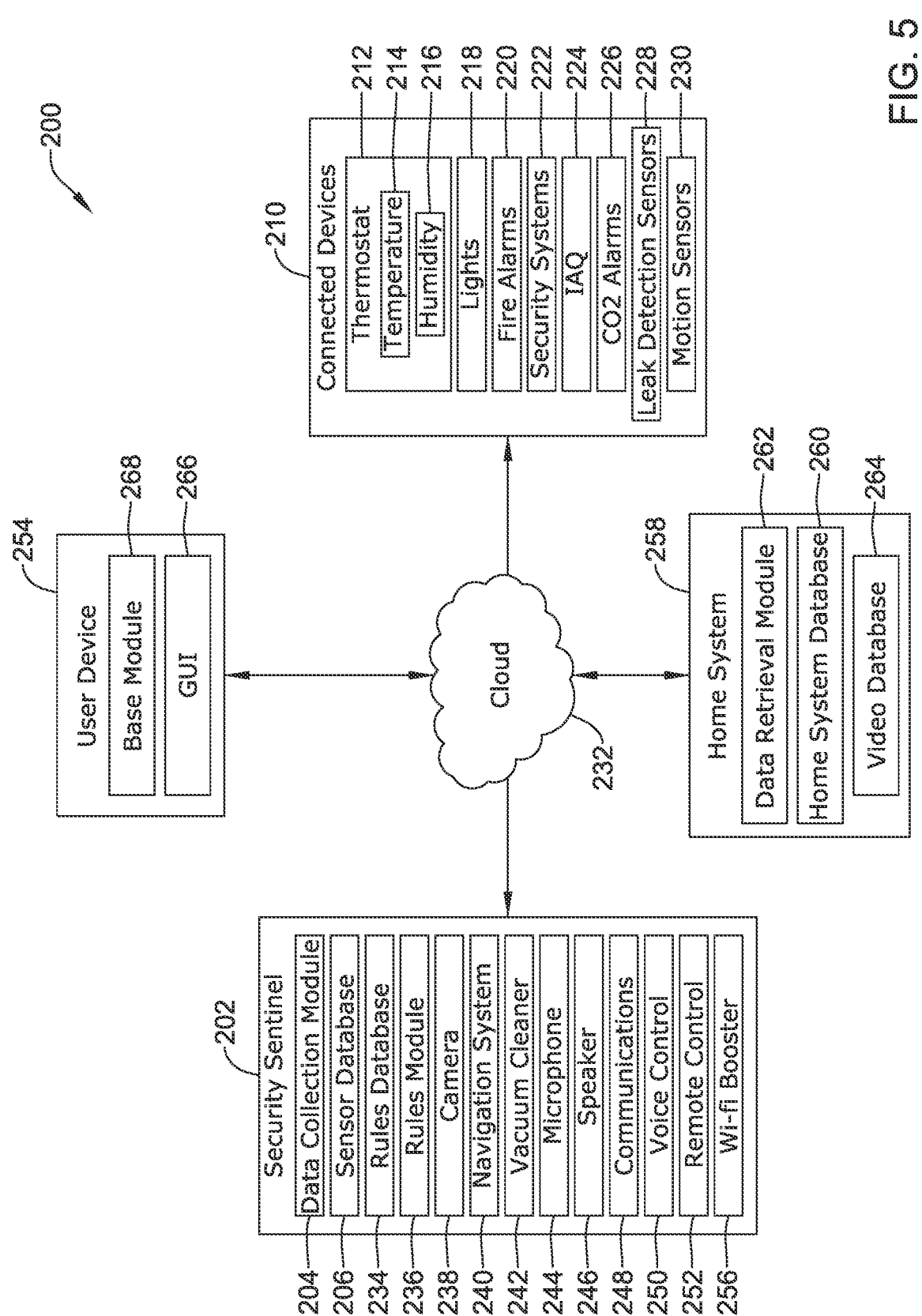
FIG. 5 is schematic block diagram of a security sentinel system.

FIG. 5 is a block diagram of an illustrative security system 200 including a robot security sentinel 202. In some embodiments, the security sentinel 202 may be a robotic vacuum or other mobile internet connected device positioned within a building or residence. The security sentinel 202 may be configured to maneuver throughout a building or residence including various connected sensors 210 such as sensors and other IoT devices that collect data and/or may receive data. While the security sentinel 202 is docked or located at a home location within the building and while the security sentinel 202 moves through the building, a data collection module 204 may receive data from the sensors and devices 210 in the building and store said data in a first or sensor database 206. It is contemplated that the data collection module 204 may be in direct communication with the sensors and devices 210 via suitable standard wireless protocols which may include, for example, cellular communication, ZigBee, Bluetooth, WiFi, IrDA, dedicated short range communication (DSRC), EnOcean, or any other suitable wireless protocols. In other embodiments, the communication may pass through an intermediary server or cloud network 232, but this is not required. In some cases, the data collection module 204 may be a controller similar in form and function to the controllers 22, 38 described above and include the same or similar components and capabilities.

The sensors and connected devices 210 may be a part of a building automation system and may include components of an HVAC system (e.g., including, but not limited to, a thermostat 212, temperature sensors 214, humidity sensors 216, etc.), a lighting control system (e.g., including, but not limited to, network connected lights 218), a fire suppression system (e.g., including, but not limited to, fire alarms 220, smoke detectors, sprinkler systems, etc.), a security system 222 (e.g., including, but not limited to, motion sensors, limit switches, noise sensors, cameras etc.), or other internet enabled or "smart" devices (e.g., including, but not limited to indoor air quality (IAQ) monitors 224, carbon dioxide or carbon monoxide sensors 226, leak detection sensors 228, motion sensors 230, etc.). Any of the sensor or devices may be a part of or linked to other portions of the building automation system. For example, in some cases, the carbon dioxide or carbon monoxide sensors 226 may be a part of the HVAC system, although this is not required. The sensors 206 may be any type of sensor, device (including IoT devices), or detectable event suitable for operation in or use within a building automation system. Other sensors or devices 210 may include, but are not limited to, occupancy sensors, proximity sensors, microphones, video cameras, still image cameras, a horn or alarm, fire, smoke, water, carbon monoxide, and/or natural gas detectors, a damper actuator controller (e.g., that closes a damper during a fire event), a light controller, smart light bulbs, home appliances such as, but not limited to, robotic vacuums, coffee pots, etc., water heaters, voice activated smart speakers (e.g., AMAZON ECHO™ or GOOGLE HOME™), WiFi enabled power outlets, garage door openers, door locks, televisions, speakers, doorbells, water valves, video cameras, wearable devices, radiofrequency receivers, thermal imagers, radar devices, lidar devices, ultrasound devices, etc.

The security sentinel 202 may further include a sensor database 206 which contains the sensor data (e.g., sensed condition) received from the one or more connected devices or sensors 210 in the home or building. For example, a memory accessible by a processor of the data collection module 204 may be configured to store the database 206 of sensor data such that historical and current sensor data is readily accessible. The security sentinel 202 may maintain a second, or rules, database 234 including a set of rules or algorithms that may be used to identify certain conditions within or near the building or residence and to determine if a recommendation should be made to a user, if the security sentinel 202, and/or if other sensors or devices 210 should be activated, as will be described in more detail herein. For example, a motion sensor 230 may detect motion in part of the house where motion is unexpected for a given time period. In response to the motion sensor 230 indicating a rule condition has been met, the security sentinel 202 may be activated and maneuvered to the location of the motion sensor 230 for further investigation and data gathering. The security sentinel 202 may be activated and maneuvered without user intervention.

A set of rules may include at least one rule, two or more rules, three or more rules, etc. Each rule may define one or more events that include one or more detectable conditions that when present may be indicative of an alert condition. The one or more detectable or sensed condition are indicative of a condition of the space in which the security sentinel 202 is located and may be data available from any of, but not limited to, the sensors 210 described herein. The space may be interior to a home or exterior to the home, as desired. The alert condition may be indicative of an undesirable condition in the home (e.g., too hot or too cold), an unsafe condition in the home (e.g., presence of carbon monoxide or smoke), of an intruder or unexpected person in the home, etc. An alert condition does not necessarily an urgent or a distress situation. Rather, an alert condition is one that initiates further actions taken by various components of the security system 200. A memory accessible by the processor of the data collection module 204 may be configured to store the rules database 234 such that the rules and algorithms are readily accessible.

In some embodiments, the security sentinel 202 may also include a rules module 236. In some embodiments, the rules module 236 may be a separate controller and/or processor from the data collection module 204, although this is not required. In other embodiments, the rules module 236 may be a part of the data collection module 204. In yet other embodiments, the rules module 236 and the data collection module 204 may be components of a security sentinel 202 system controller (not explicitly shown). In yet further embodiments, the rules modules 236, or the processing of sensor data and comparison of the data to the rules database 234 may be performed in the cloud 232 or otherwise remote from the security sentinel 202. The rules module 236 may be configured to compare the data in the sensor database 206 to the rules database 234 and determine if there is any sensor data outside of a threshold defined by the rule. If there is sensor data outside of the predefined threshold, the rules module 236 may flag the sensor or device 210. In some cases, the rules module 236 may be configured to command the security sentinel 202 to travel to the location of the flagged sensor or device 210 where the security sentinel 202 may collect more data from the flagged sensor or device 210 to compare to the rules datable 234. In some cases, the rules module 236 may be configured to notify the user of the flagged sensor or device 210. If the newly collected sensor data remains outside of the predefined threshold, the rules module 236 may be configured to notify the user, active additional sensors or devices, and/or activate other components (e.g., a still or video camera 238) of the security sentinel 202.

When the rules database 234 indicated that the user should be notified, an alert or notification may be sent to the user via a remote user device 254. The remote device 254 may be any internet connected device including a smart phone, tablet, e-reader, laptop computer, personal computer, etc. Once the notification has been received at the base module (e.g., an app or other program) 268, the notification may be displayed on a user interface 266 of the device 254. In some cases, an audio alert (e.g., a beep or chime) or a haptic alert (e.g., a vibration) may accompany the notification to alert the user of the notification.

In some embodiments, the rules database 234 may be downloaded onto the security sentinel 202 located within the residence from an external server(s) over a network. The network may be a wide area network or global network (WAN), such as the internet. The external server(s) may be a suite of hardware and software which may sometimes be referred to as "the cloud" 232. In some cases, the communication may pass through an intermediary server or cloud network 232, but this is not required. In some cases, the cloud 232 may provide the ability for communication amongst the security sentinel 202, the external server(s), the home system 258, the connected sensors or devices 210, and/or one or more remote devices 254. If so provided, the external server(s) may be connected to a single building having a security system 200 or the external server(s) may be connected to a plurality of security systems as described with respect to FIG. 4. The external server(s) may collect and store data from the various devices and sensors 210 from the one or more connected security systems 202. In other embodiments, the rules database 234 may be generated locally using a user interface of a controller of the home system 258, a user interface of the security sentinel 202 (if so provided, a remote device (e.g., user device 254), a web client, etc.

The security sentinel 202 may further include a navigation system 240. The navigation system 240 may be configured to map a room using infrared sensors and provide the ability for the security sentinel 202 to move throughout one or more rooms or living spaces without issue. When the security sentinel 202 is a robotic vacuum, the security sentinel 202 may also include a vacuum cleaner 242 which is an electrical apparatus that collects dust and small particles from the floors and other surfaces by means of suction. The vacuum cleaner 242 may also include rotating brushes and/or other features configured to help collect dust and small particles.

The security sentinel 202 may be further provided with additional devices and system configured to enhance the security of the home or building and/or increase the usability of the security sentinel 202. For example, the security sentinel 202 may also include a microphone 244, which an instrument for converting sound waves into electrical energy variations, which may then be amplified, transmitted, or recorded. In some embodiments, the microphone 244 may be activated when the rules module 236 deploys the security sentinel 202 to a flagged sensor or device 210. The microphone 244 may be used to listen for unexpected noises from a mechanical device which may indicate a problem with the device or to listen for sounds or voices from an unexpected person. These are just some examples. The security sentinel 202 may also include a speaker 246 which is an electroacoustic device, often housed in a cabinet and that is connected as a component in an audio system, its function being to make speech or music audible. In some embodiments, the speaker 246 may be activated to allow a user to communicate with another person (or pet) in the home or building. Additionally, or alternatively, the speaker 246 may be configured to emit prerecorded messages or other audio alerts to notify occupants of the home of a detected condition (e.g., fire, intruder, etc.). The security sentinel 202 may also include a still camera and/or a video camera 238 configured to record still or moving images. In some embodiments, the camera 238 may be configured transmit live images or video to a user. Additionally, or alternatively, the camera 238 may be configured to capture and record images or video in a memory of the camera 238 and/or a memory of the security sentinel 202 for later access.

The security sentinel 202 may also include communication channels 248 which provide the ability for the security sentinel 202 to communicate with other devices by way of suitable standard wireless protocols may include, for example, cellular communication, ZigBee, Bluetooth, WiFi, IrDA, dedicated short range communication (DSRC), EnOcean, or any other suitable wireless protocols. The communications channels 248 may be a part of the data collection module 204, rules modules 236 and/or a controller of the security sentinel 202, as desired. The security sentinel 202 may also be provided with a Wi-Fi booster or extender 256 configured to extend the coverage of the local Wi-Fi network. The booster 256 may work by receiving the existing Wi-Fi signal, amplifying it and then transmitting the boosted signal.

In some embodiments, the security sentinel 202 may be provided with voice control 250 which allows the user to send verbal commands to the security sentinel 202 (e.g., which may be received via the microphone 244). The voice control 250 may include the control logic necessary to process the voice commands. Alternatively, or additionally, the security sentinel 202 may include a remote control 252 which provides the user the ability to control the security sentinel 202 remotely. In some cases, the remote control 252 may be a separate and dedicated device configured to communicate specifically with the security sentinel 202 (e.g., as in a television remote). Alternatively, or additionally, the remote control 252 may be a user device 254 including one or more application program codes (i.e., apps) configured to communicate with and/or control the security sentinel 202, as will be described in more detail herein.

The security system 200 may further include a home system 258. The home system 258 may be a security system or other platform for controlling and/or communicating with the connected sensors or devices 210 in the home. For example, the home system 258 may include a controller configured to execute a control program for a security system (e.g., arming/disarming) and/or a control program for an HVAC system. In some cases, the home system 258 may act as an intermediary between the security sentinel 202 and the user, although this is not required. For example, in some embodiments, the home system 258 may be configured to store a collection of all of the data from the sensors and device 210, for example, in a home system database 260, to report the data back to the user. The home system 258 may further include a data retrieval module 262 which may connect to the security sentinel 202 to receive the collected data and stores the data in the home system database. If the security sentinel 202 has recorded video, the data retrieval module 262 may be configured to store the video data in the video database 264. The data retrieval module 262 may be provided as a part of or separate from a controller configured to issue operating commands to the home system devices 210.

Figure 6:
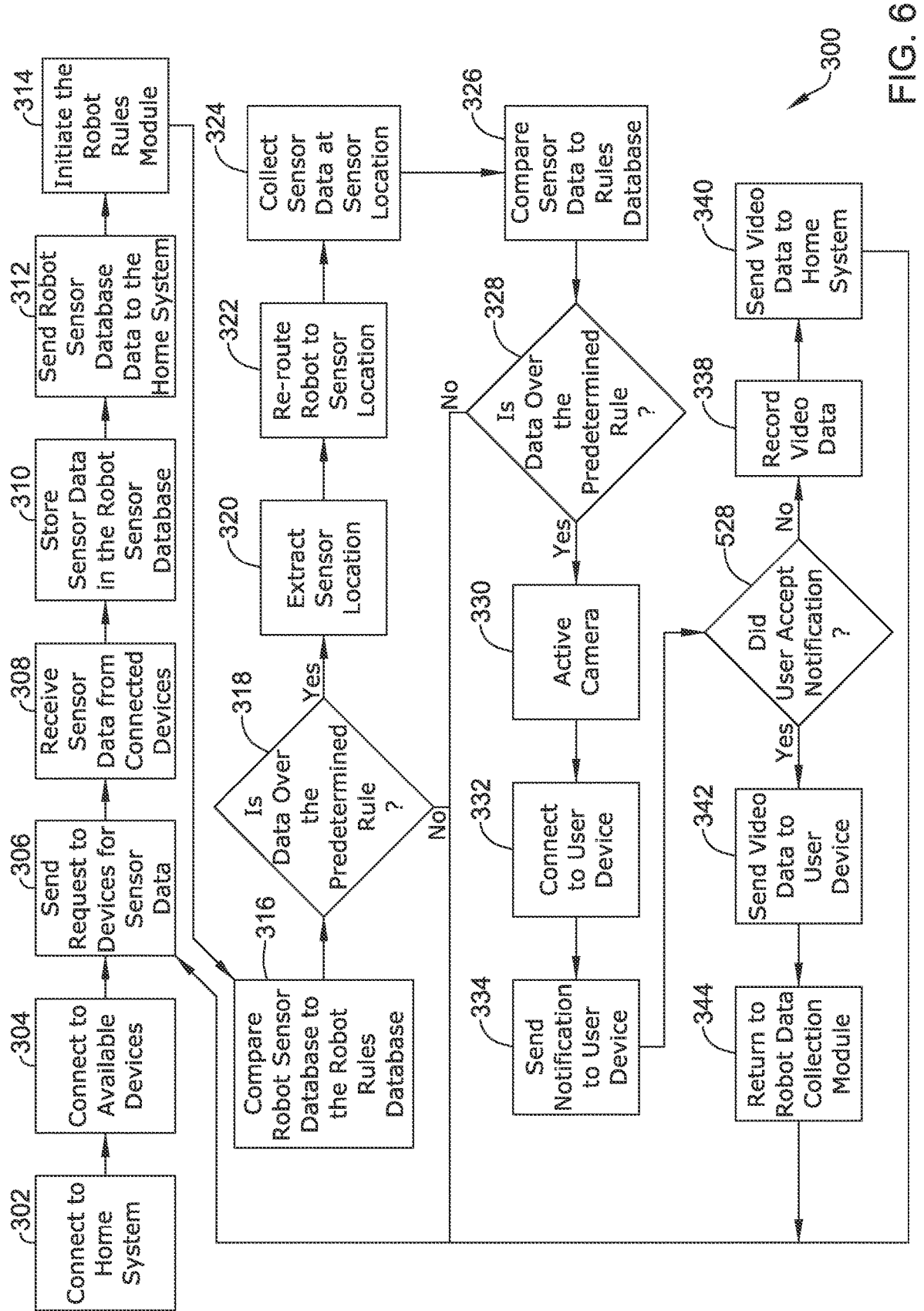
FIG. 6 is a flow chart of an illustrative method for data collection and determining if alert condition is present.

FIG. 6 illustrates a flow chart 300 of an illustrative method for data collection and determining if alert condition is present and if further action should be taken. To begin, the data collection module 204 of the security sentinel 202 is connected to the home system 258, as shown at block 302. The data collection module 204 may be configured to automatically scan the local area network and automatically connect with the home system 258. In other embodiments, user intervention via a user interface (of the security sentinel 202 and/or the home system 258) a remote device 254, and/or a web client may be required to connect the data collection module 204 to the home system 258. Once the data collection module 204 is connected to the home system 258, the data collection module 204 connects to the available sensors and devices 210, as shown at block 304. In some cases, the home system 258 may act as an intermediary to facilitate connecting the data collection module 204 with the available sensors and devices 210. Once communication has been established between the data collection module 204 and the available sensors and devices 210 (either directly or indirectly via the home system 258), the data collection module 204 may send a request to the sensors and devices for data, as shown at block 306. In response to the request, the data collection module 204 then receives data from the connected devices 210, as shown at block 308. The data collection module 204 then stores the data in the sensor database 206, as shown at block 310.

Referring briefly to FIG. 7, which illustrates an example sensor database 400, the sensor database 400 may record additional information beyond the measured or perceived parameter. While the database 400 is referred to as a "sensor" database, the database 400 may also include data obtained from other IoT devices that do not include sensors. The sensor database 400 may record the date 402 and the time 404 the data was obtained. The sensor database 400 may also record the sensor name and/or type of sensor 406 and the sensor location 408. This may allow different rules to be applied to specific sensors 210. The sensor database 400 also records the actual data 410 received from the sensor 210. The data may be binary (e.g., on/off, yes/no, enter/exit, etc.), a numerical value, or other data, as desired. In some cases, a length of time a reading is valid may also be recorded. While not explicitly shown, the sensor database 400 may record a system identification. The system identification may tie the data to a particular security sentinel 202 or security system 200 such that data can be aggregated with other systems having similar household demographics.

Returning to FIG. 6, after the data has been stored, or substantially simultaneously therewith, the data collection module 204 sends the data to the home system 258 where it is stored in the home system database 260, as shown at block 312. After the data has been sent, or substantially simultaneously therewith, the data collection module 204 may initiate the rules module 236, as shown at block 314. The rules module 236 then compares the sensor database 206 with the rules database 234, as shown at block 316. It is contemplated that the storage of information and the processing thereof may be performed within the security sentinel 202, within a dedicated module 236 in the security sentinel 202, or remotely from the security sentinel 202, as desired. This may be performed at predefined time intervals or in response to a particular sensor reading, or other triggering event. As the sensor database 206 is compared to the rules database 234, the rules module 236 may determine if the data exceeds a threshold for a corresponding predetermined rule, as shown at block 318. If the sensor data does not exceed a predetermined threshold, the process returns to block 306 where the data collection module 204 sends a request for sensor data. In other words, the rules will be repeatedly applied to the collected data to identify when a rule defined event occurs. If the sensor data exceeds a threshold, an alert condition is triggered and the sensor location is extracted from the sensor database 206, as shown at block 320. The security sentinel 202 is then directed to move towards the sensor location which triggered the alert condition, as shown at block 322. If the security sentinel 202 is already mobile, the direction of travel may be rerouted to the sensor location which triggered the alert condition.

Once the security sentinel 202 arrived at the sensor location, the data collection module 204 collects additional data from the triggering sensor, as shown at block 324. The rules module 236 then compares this newly acquired sensor data to the rules database, as shown at block 326. As the sensor database 206 is compared to the rules database 234, the rules module 236 may determine if the data exceeds a threshold for a corresponding predetermined rule, as shown at block 328. If the sensor data does not exceed a predetermined threshold, the process returns to block 306 where the data collection module 204 sends a request for sensor data.

If the newly acquired sensor data also exceeds a threshold, the camera 238 on the security sentinel 202 is activated, as shown at block 330. The security sentinel 202 may then establish a connection to the user device 254, as shown at block 332. Once the connection has been established, the security sentinel 202 may send a notification to the user device 254, as shown at block 334. The notification may include information regarding which sensor triggered the notification and the corresponding data. The notification may further allow the user to accept or decline the notification, as shown at block 336. If the user declines or otherwise does not accept the notification, the security sentinel 202 records video data of the sensor location, as shown at block 338. This video may then be sent to the video database 264 in the home system 258, as shown at block 340, where the user may access it at a later time. In some cases, the security sentinel 202 may record video for a predetermined length of the time. It is contemplated that the length of time video is recorded may vary depending on the triggering sensor. The process then returns to block 306 where the data collection module 204 sends a request for sensor data.

If the user accepts the notification, the video data may be sent to the user device 254, as shown at block 342. The video data may be sent in real time or near to real time to allow the user to view the conditions which triggered the alert condition. For example, if a leak detector has detected a leak (such as, but not limited to, a water leak), the user may be able to view the extent of the leak and determine if immediate corrective action is required. This is just one example of some information that may gleaned from a video stream. It is contemplated that the security sentinel 202 may transmit the video data for a predetermined length of the time (which may be variable) or until the user terminates the transmission, as desired. Control is then returned to the data collection module 204, as shown at block 344 and the process then returns to block 306 where the data collection module 204 sends a request for sensor data.

FIG. 8 illustrates an example system rules database 500. The rules database 500 illustrated in FIG. 8 is not intended to provide a complete listing of the events which may result in an alert condition. Instead, the rules database 500 is provided as an example of some rules defining events that may be generated for increase the security or comfort (and/or prevent damage thereto) of a building. The rules database 500 may include a time range 502 for which the rule applies. For example, rules related to the security of a building may be applied only when the building is unoccupied or expected to be unoccupied whereas conditions which may result in property damage or hazardous conditions to the occupants may be continuously monitored. The rules database 500 may also include the device or sensor name and/or location 704 and a data range 506 which is considered acceptable. In some cases, the data range may include a lower limit and an upper limit where the rule defined event is considered to occur if the data is below the lower limit or above the upper limit. In other cases, the data range may be a binary range (detected/not detected, activated/deactivated, on/off, etc.). While each row of the rules database 500 illustrates a single rule defined event, it is contemplated that two or more sensor readings can be combined into a single rule, as desired. In some cases, the data from a single device meeting a predetermined criteria may be sufficient to generate an alert condition. In other cases, the combined data from two or more sensors or devices meeting predetermined criteria may generate an alert condition. Some events that may result in an alert condition may include, but are not limited to, an indoor temperature outside a predetermined range, an indoor humidity outside a predetermined range, an indoor air quality outside a predetermined range, an activated fire alarm, an activated carbon dioxide or carbon monoxide detector, an activated security system sensor, a detected leak, detected motion, etc. It should be understood that the above listing of events is not intended to be comprehensive but rather illustrative of some events that can be monitored using a security system and/or security sentinel 202.

Figure 9:
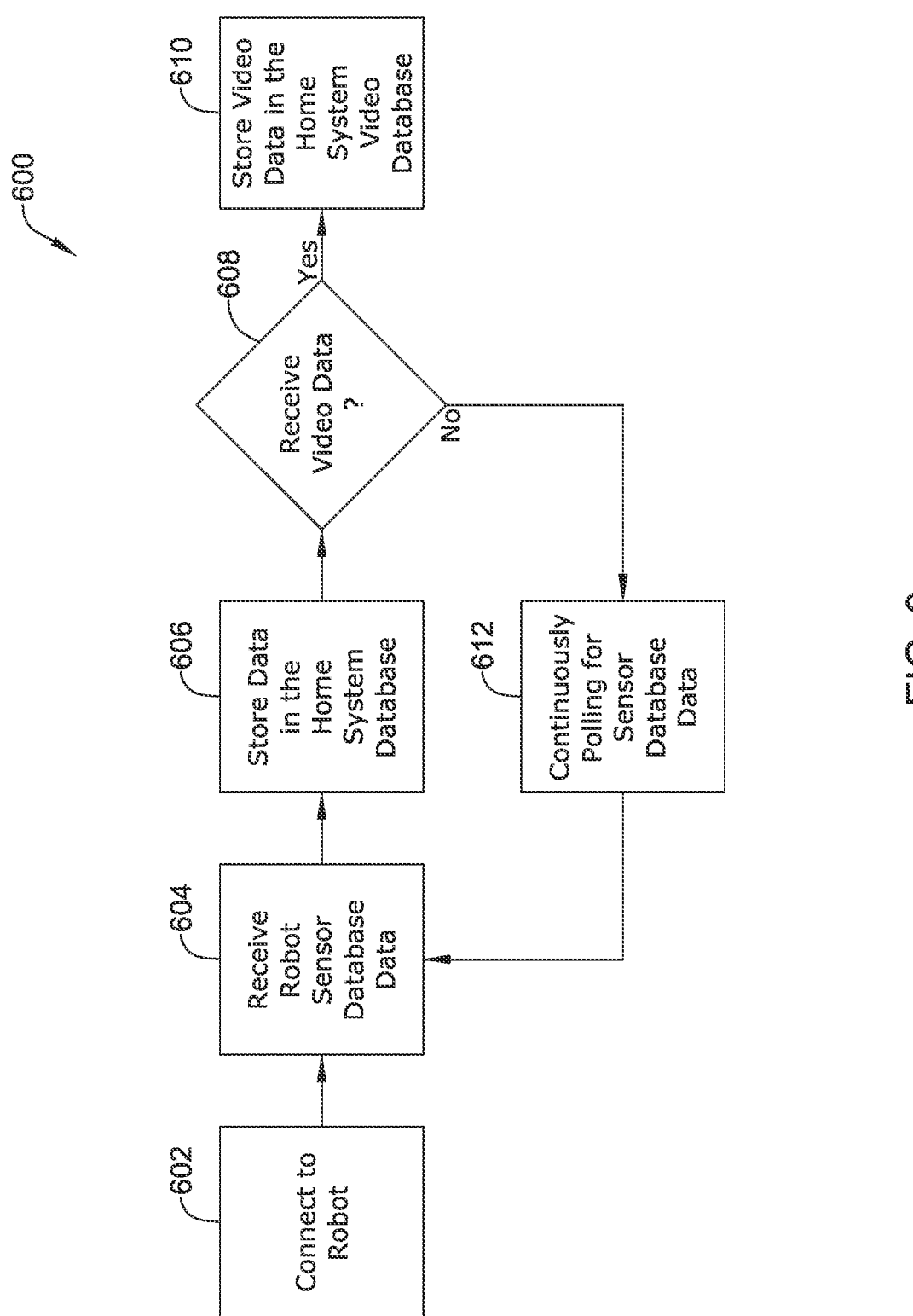
FIG. 9 is flow chart of an illustrative method for retrieving data from the security sentinel an illustrative.

FIG. 9 illustrates a flow chart 600 of an illustrative method for retrieving data from the security sentinel 202. In some cases, the home system 258 may be configured to request data from the security sentinel 202 (additionally, or alternatively to the security sentinel 202 automatically transmitting said data). The process begins with the data retrieval module 262 of the home system 258 connecting to the security sentinel 202, as shown at block 602. The data retrieval module 262 receives the sensor database 206 from the security sentinel 202, as shown at block 604. The sensor data is stored in the home system database 260, as shown at block 606. The home system database 260 may include similar information to the sensor database 206 in the security sentinel 202. The data retrieval modules 262 may analyze the data to determine if video data was received from the security sentinel 202, as shown at block 608. If no video data was received, then the process returns to continuously polling for data from the security sentinel 202 until it is received, as shown at block 612. The process then resumes with the data retrieval module 262 receiving the data, as shown at block 604. Returning to block 608, if video data was received, then the video data is stored in the video database 264.

Figure 10:
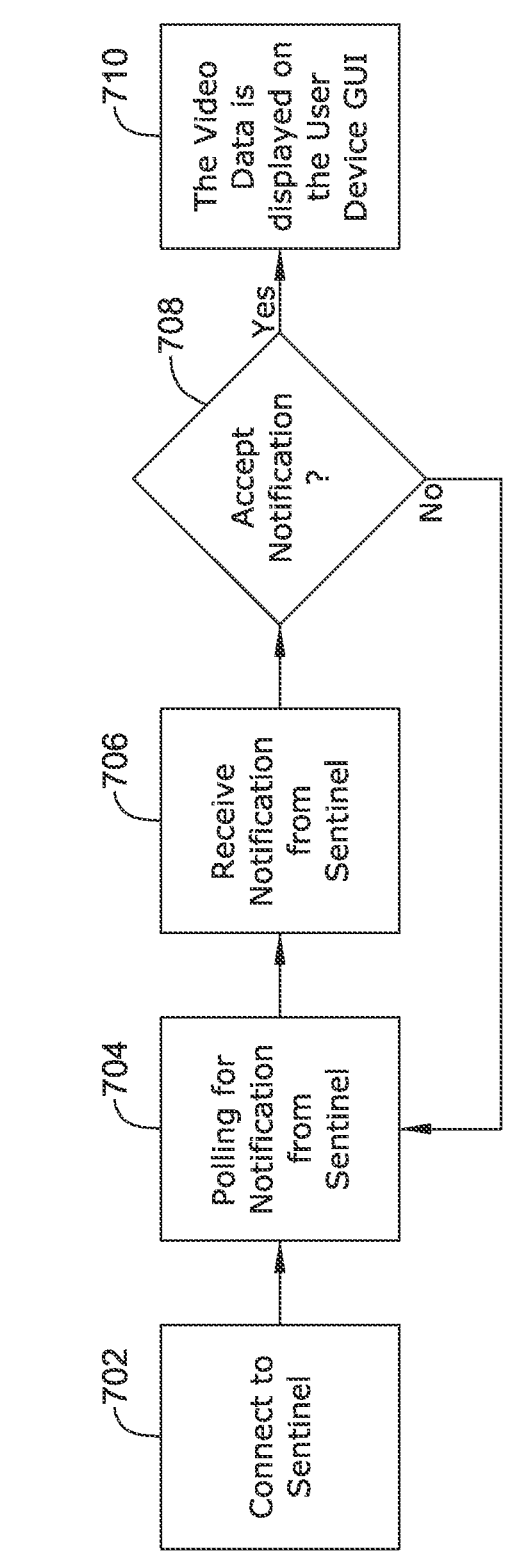
FIG. 10 is flow chart of an illustrative method for operating the user device base module.

FIG. 10 illustrates a flow chart 700 of an illustrative method for operating the user device base module 268. The method or process begins with the base module 268 connecting to the security sentinel 202, as shown at block 702. The base module 268 may continuously poll for a notification from the security sentinel 202, as shown block 704. In some cases, the base module 268 may poll on a continuous basis or an intermittent basis, as desired. Once the base module 268 receives a notification from the security sentinel 202, as shown at block 706, the base module 268 may then determine whether the user accepted the notification, as shown at block 708. If the notification was accepted the video data is displayed on the user device user interface 266, as shown at block 710, but if the notification was not accepted the process returns to polling for notification from the security sentinel 202, as shown at block 704.

The various modules described herein disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method comprising:

monitoring, over a network via a location monitoring application, activity at a location via a set of device, each device in the set of devices corresponding to a different position within the location;

determining, based on the monitored activity, an occurrence of an event, the event determination comprising at least one device in the set of devices detecting a condition and collecting data for the event upon the condition being detected that triggers the at least one device to collect the data, the determining the occurrence of the event comprising:

detecting, via a first device of the set of devices, the condition exceeding a predetermined threshold associated with a rule-defined event;

accessing a rules database storing a plurality of rules, each rule defining (i) the rule-defined event detectable via sensed conditions from the set of devices, (ii) position-specific criteria for the event, and (iii) a recommended action specific to a position associated with the event; and applying at least one of the plurality of rules to the collected data to identify when the rule-defined event occurs;

determining, based on analysis of the collected data related to the event, a position within the location associated with the event, the position determination comprising:

correlating the collected data with position data from the set of devices to isolate a specific position of the rule-defined event; and selecting a specific device from the set of devices that is proximate to the specific position;

causing, over the network, the selected device proximate to the determined position within the location to activate image capture capabilities;

recording, in a database on the network, captured content via the device proximate to the determined position; and causing display, within a user interface (UI) associated with the location monitoring application, of the captured content, the display enabling controls related to at least the determined position within the location.

2. The method of claim 1, wherein the enabled controls correspond to at least one of requesting supplemental information related to the event, modifying operation of the set of devices and controlling the location via the location monitoring application.

3. The method of claim 1, further comprising:

identifying a zone within the location, the zone comprising a subset of the set of devices; and causing the subset of devices within the zone to activate to capture content related to the event.

4. The method of claim 1, further comprising:

extracting a device identifier (ID) for the device proximate to the determined position, wherein the determined position within the location is based on information related to the extracted device ID.

5. The method of claim 1, further comprising:

identifying a current location of a security device within the location; and communicating, over the network, instructions causing the security device to travel to the position within the location associated with the event.

6. The method of claim 5, wherein the security device is the device proximate to the determined position.

7. The method of claim 5, further comprising:

controlling features of the security device based on a type of the event.

8. The method of claim 1, further comprising:

retrieving recorded video from the device proximate to the determined position, the recorded video corresponding to captured content related to a time of the event; and causing display within a user interface (UI) associated with the location monitoring application.

9. The method of claim 1, wherein the set of devices comprise a set of sensors.

10. The method of claim 1, wherein the location monitoring application is at least one of a security application and climate control application.

11. A system comprising:

a processor configured to:

monitor, over a network via a location monitoring application, activity at a location via a set of device, each device in the set of devices corresponding to a different position within the location;

determine, based on the monitored activity, an occurrence of an event, the event determination comprising at least one device in the set of devices detecting a condition and collecting data for the event upon the condition being detected that triggers the at least one device to collect the data, the determining the occurrence of the event comprising:

detecting, via a first device of the set of devices, the condition exceeding a predetermined threshold associated with a rule-defined event;

accessing a rules database storing a plurality of rules, each rule defining (i) the rule-defined event detectable via sensed conditions from the set of devices, (ii) position-specific criteria for the event, and (iii) a recommended action specific to a position associated with the event; and applying at least one of the plurality of rules to the collected data to identify when the rule-defined event occurs;

determine, based on analysis of the collected data related to the event, a position within the location associated with the event, the position determination comprising:

correlating the collected data with position data from the set of devices to isolate a specific position of the rule-defined event; and selecting a specific device from the set of devices that is proximate to the specific position;

cause, over the network, the selected device proximate to the determined position within the location to activate image capture capabilities;

record, in a database on the network, captured content via the device proximate to the determined position; and cause display, within a user interface (UI) associated with the location monitoring application, of the captured content, the display enabling controls related to at least the determined position within the location.

12. The system of claim 11, wherein the enabled controls correspond to at least one of requesting supplemental information related to the event, modifying operation of the set of devices and controlling the location via the location monitoring application.

13. The system of claim 11, wherein the processor is further configured to:

identify a zone within the location, the zone comprising a subset of the set of devices; and cause the subset of devices within the zone to activate to capture content related to the event.

14. The system of claim 11, wherein the processor is further configured to:

extract a device identifier (ID) for the device proximate to the determined position, wherein the determined position within the location is based on information related to the extracted device ID.

15. The system of claim 11, wherein the processor is further configured to:

identify a current location of a security device within the location; and communicate, over the network, instructions causing the security device to travel to the position within the location associated with the event.

16. The system of claim 15, wherein the security device is the device proximate to the determined position.

17. The system of claim 15, wherein the processor is further configured to:

control features of the security device based on a type of the event.

18. The system of claim 11, wherein the processor is further configured to:

retrieve recorded video from the device proximate to the determined position, the recorded video corresponding to captured content related to a time of the event; and cause display within a user interface (UI) associated with the location monitoring application.

19. The system of claim 11, wherein the set of devices comprise a set of sensors.

20. The system of claim 11, wherein the location monitoring application is at least one of a security application and climate control application.

* * * * *